United States Patent Office 3,728,082
Patented Apr. 17, 1973

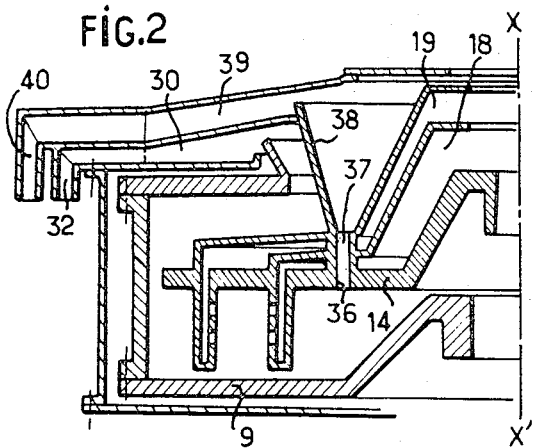
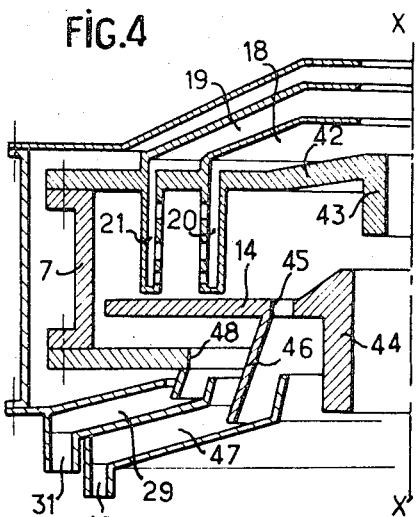
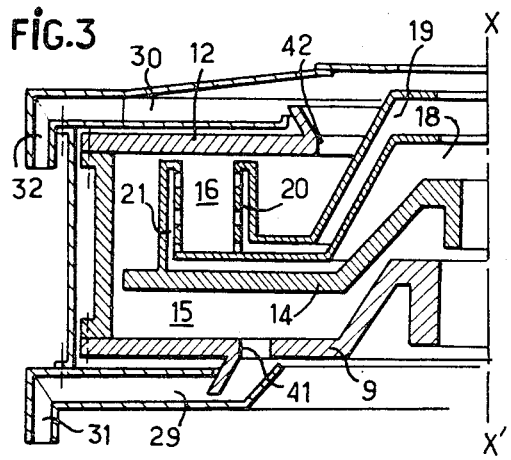
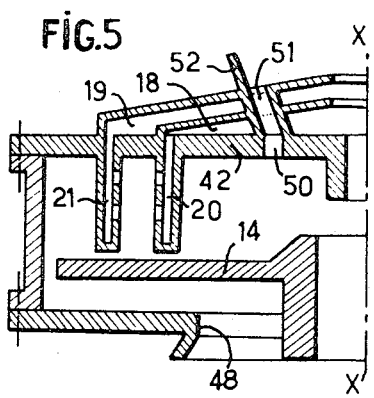
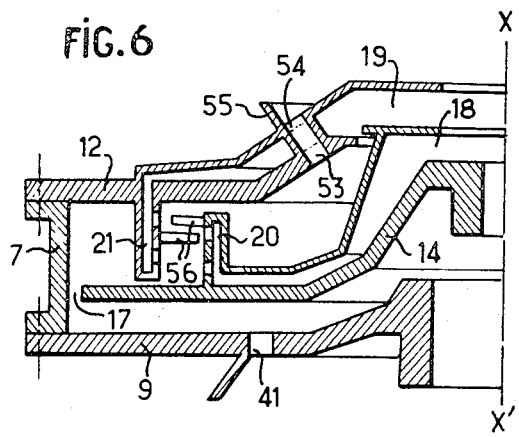

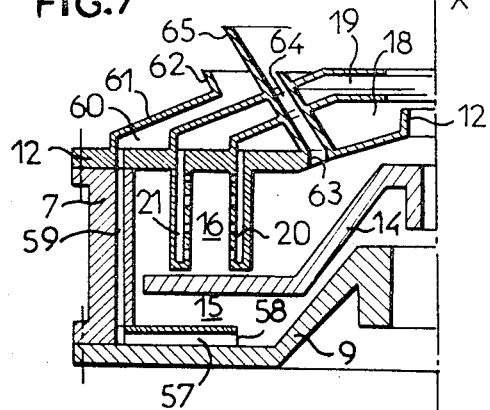
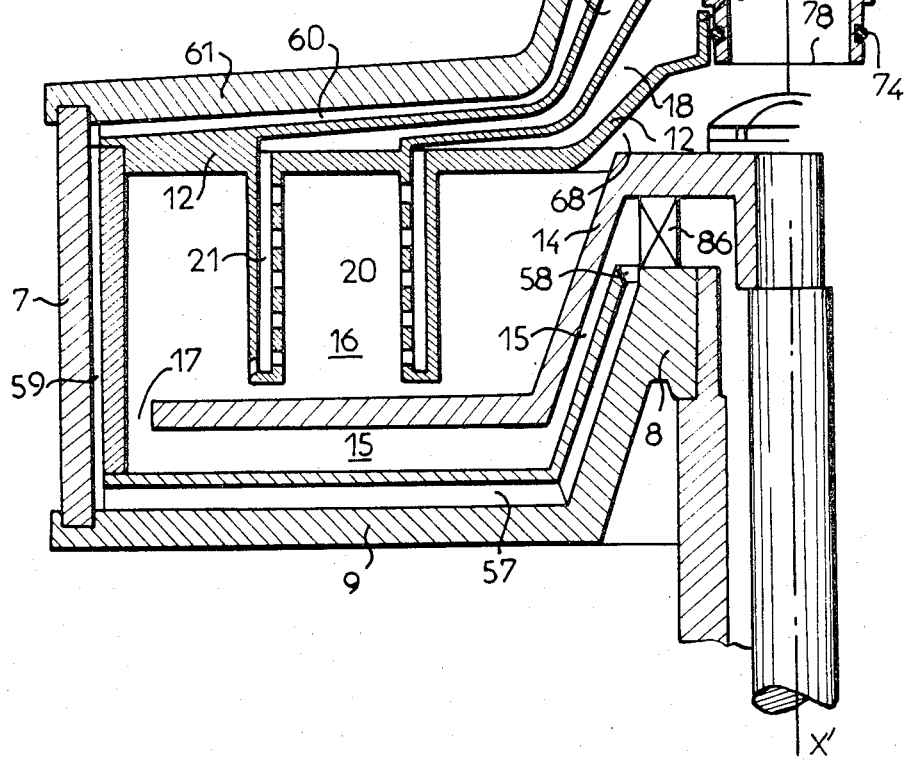

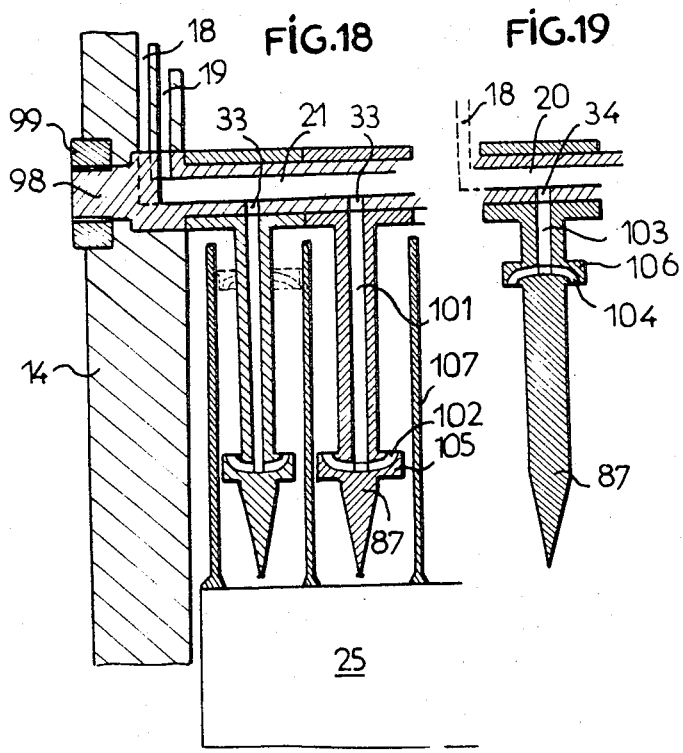
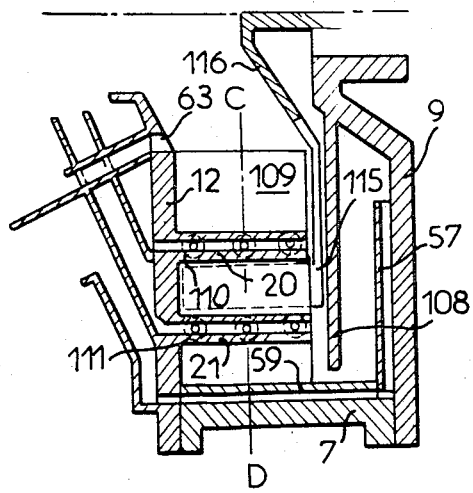
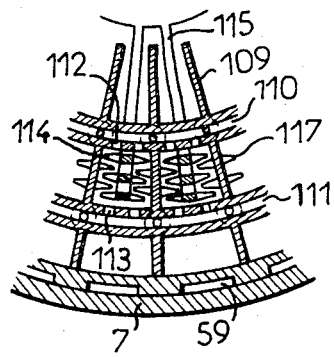

3,728,082
APPARATUS FOR LIQUID-LIQUID EXTRACTION
Francois Joseph Henri Hubert Mathieu and Odile Jeanne
Marie Mathieu, both of 18 Rue d'Edimbourg, Calais,
France
Filed Oct. 29, 1968, Ser. No. 784,273
Claims priority, application France, Oct. 31, 1967,
126,467
Int. Cl. B01d *11/04*
U.S. Cl. 23—269
2 Claims

ABSTRACT OF THE DISCLOSURE

The invention is concerned with a process and apparatus for carrying out liquid-liquid extraction by counterflow contact, wherein the two liquids move in a direction opposite to each other under the action of a centrifugal field and are subjected to agitation for dispersing them in one another.

Liquid-liquid extraction, which consists in bringing into contact two immiscible liquids of different densities, so that the substance contained in solution in one of them passes to the greatest possible extent into solution in the other liquid is a well known and very widely employed technique.

It is known that the contact of two liquids has the most rapid effect when the said liquids are dispersed in one another, which increases the surface of their contact and their exchange, and that the efficency of the exchange is better when the circulation of the two liquids takes place by constant counterflow or by counterflow by stages: for the same rate of extraction less solvent is necessary than by the method of successive contacts by parallel flow. Counterflow circulation and the separation of the liquids into two phases after bringing them into contact are promoted by the existence of a centrifugal acceleration.

There are types of centrifugal extraction apparatus in which the two liquids circulate in continuous counterflow for the entire duration of the contact between them, but their state of dispersion is indifferent. In other apparatus, the general circulation considered from the inlet to the outlet takes place by counterflow, from stage to stage, but their contacting, at the rate of one contact per stage, takes place in parallel flow. Separation of the liquids is therefore necessary after each contact.

These two types of apparatus have the drawback of a low output for their bulk, either owing to the size of the contact channels or owing to the necessity of separating the two liquids at each stage. In addition the pressure losses in the conduits of the apparatus are a cause of limited output, and the power absorbed by the liquid dispersing device at each stage is considerable.

The process according to the invention consists in agitating the two liquids in a zone in which they circulate in counterflow by the effect of centrifugal acceleration for dispersing them in one another during this circulation.

The accompanying drawings illustrate a preferred embodiment of the invention. In such drawings:

FIGS. 2–7 are simplified vertical sections of the apparatus according to the invention showing alternative embodiments of the means for feeding and discharging light and heavy liquids respectively;

FIG. 8 is a detailed sectional view showing the arrangement of the shafts carrying the rotary members of FIG. 7;

FIGS. 15–19 are sectional views showing an alternative arrangement of the distributing means shown in FIG. 14; and, FIGS. 20 and 21 are partial views showing in vertical and horizontal section respectively another modification wherein a reciprocating movement is imparted to the agitating means.

Figure 1:
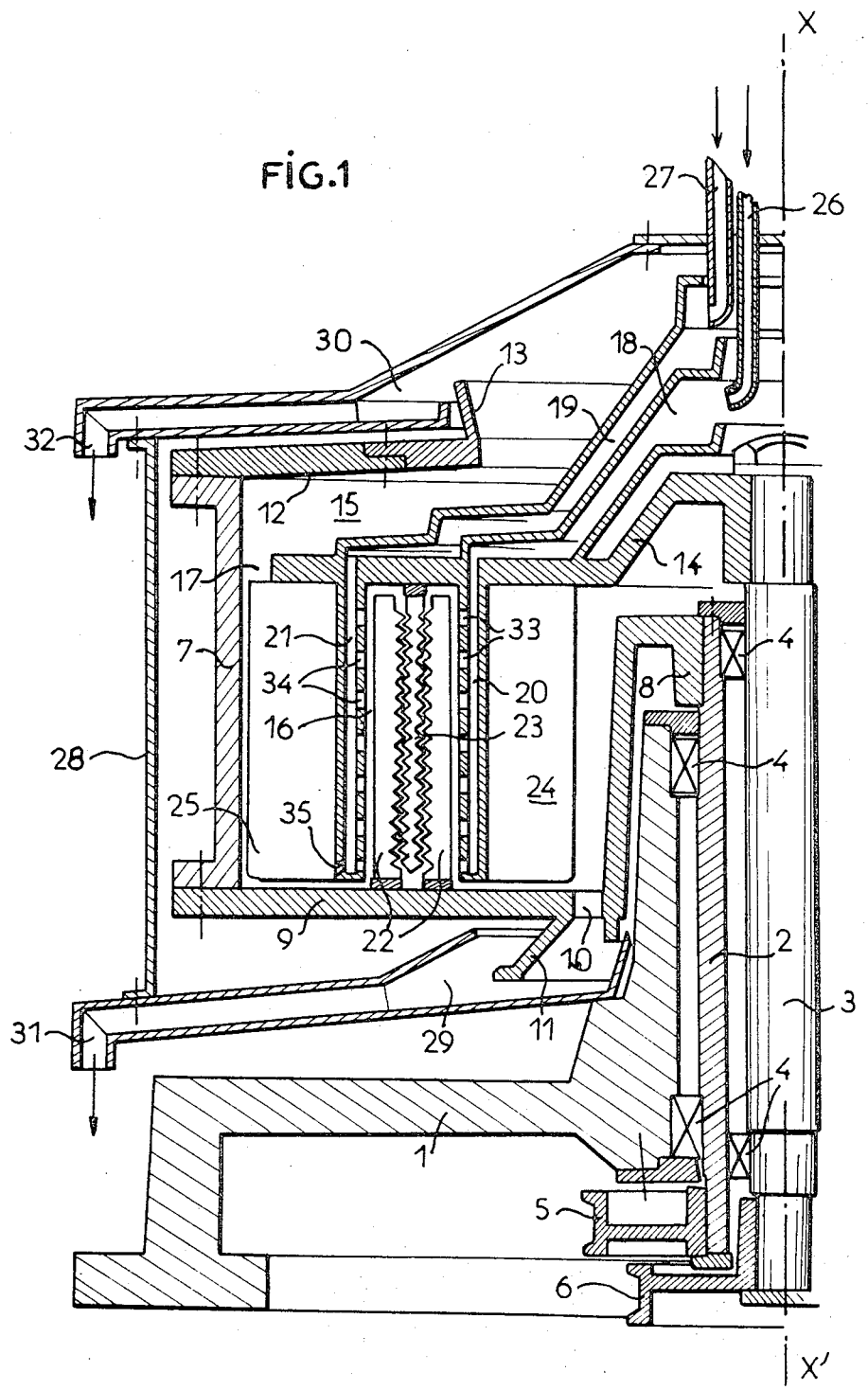
FIG. 1 is a vertical section of apparatus for carrying out liquid-liquid extraction according to the invention.

The apparatus in which the process is carried out comprises several modifications. The following detailed description relates to one of the arrangements shown in FIG. 1 in the form of a vertical half-section of a machine having a vertical axis $x$—$x'$. A frame 1 supports a co-axial hollow shaft 2 and a solid shaft 3 by means of bearings 4. The shafts 2 and 3 are respectively equipped with pulleys 5 and 6, enabling them to be rotated independently of each other. The hollow shaft 2, by means of a hub 8, drives a drum formed of a cylindrical part 7 and two lateral walls 9 and 12. The wall 9, fast with the hub 8, has openings 10 equidistant from the axis of rotation. A conical circular deflector 11 envelops these openings. The other lateral wall 12 is provided with a detachable, circular flanged crown forming a conical deflector 13. The distance of the iner edge of 13 to the axis of rotation is greater than that of the outer edge of the openings 10. The joints between the parts 7, 9, 12 and 13 are liquid-tight. A rotor 14 is mounted on the solid shaft 3. It divides the enclosure of the drum into two chambers 15 and 16, communicating with each other by the gap 17 existing between the periphery of the rotor 14 and the wall of the cylinder 7. The rotor 14 is provided with two conduits 18 and 19 comprised between walls of revolution of cylindroconical shape, open towards the axis of revolution, and adapted to bring two different liquids respectively into two series of cylindrical distributors 20 and 21, arranged throughout the height of the chamber 16. The distributors are parallel to each other and to the axis of rotation. Those of the same series are equidistant at equal intervals over the rotor 14. The distributors 20, closer to the axis, are perforated with calibrated holes 33 on the side opposite the axis. The distributors 21 more remote from the axis, are preforated with calibrated holes 34 on the side facing the axis, and a drainage hole 35 on the side more remote from the axis. Between the two series of distributors, arranged parallel to the latter in co-axial series, are two series of toothed protuberances 22 integral with the wall 9, and between these protuberances, a series of toothed protuberances 23, fast with the rotor 14. The teeth of the parts 22 and 23 interpenetrate without coming into contact with each other. The non-fixed ends of the distributors 20 and 21 and of the protuberances 22 and 23 are very close to the walls of the chamber 16, but do not come into contact with them. The part of the chamber 16 situated between the distributors 20 and the axis of rotation is provided with radial partitions 24, of general rectangular form, distributed at regular intervals equidistant from the axis. These partitions are fixed to the rotor 14 by their short side. Their long side closer to the axis is on a level with the edge of the openings 10. Those of the partitions which are in the same radial plane as the distributors 20 are fast with them and support them by their long side more remote from the axis. The part of the chamber 16 situated between the distributors 21 and the cylindrical wall 7 is provided with radial partitions 25 fixed like the partitions 24. Their long side more remote from the axis is at a short distance from the wall 7. Those of the partitions which are in the same radial plane as the distributors 21 are fast with them and support them by their long side nearer the axis. The drum provided with parts 22 and the rotor 14 provided with distributors 20 and 21, parts 23 and partitions 24 and 25 are rotatable relative to each other without coming into contact in any position. Pipes 26 and 27 open into the inlet of the conduits 18 and 19. They are supported by a casing 28 surrounding all the movable parts and provided with drains 29 and 30, corresponding to the deflectors 11 and 13, and terminating in discharge outlets 31 and 32 for the liquids.

The apparatus of FIG. 1 functions as follows: The drum formed of the parts 7, 9, 12 and 13 is driven at a high speed by means of the hub 8, the hollow shaft 2 and the pulley 5. The internal rotor 14 is driven by the pulley 6 at a slightly different speed. The denser liquid of the two (referred to briefly as heavy liquid in the following) is continuously fed by the tube 26. By the effect of the centrifugal acceleration, it enters the rotating conduit 18, reaches the distributors 20, escapes through the holes 33, is distributed in the chambers 16 and 15, and soon fills the entire enclosure, bounded by the drum walls 7, 9, 12, 13, and with a free surface having pratically the form of a cylinder having a vertical axis and bearing on the flange 13. The heavy liquid then commences to overflow at the sill 13, is projected tangentially into the drain 30 and finally leaves the apparatus through the outlet 32. As soon as overflow of the heavy liquid occurs in the drain 30, the apparatus is fed through the tube 27 with liquid which is the less dense of the two (referred to briefly as light liquid in the following) at a rate of flow selected for the operation. By the effect of the centrifugal force, the light liquid flows into the rotating conduit 19, where it displaces the heavy liquid introduced in the first phase. It reaches the distributor 21, from which the heavy liquid is totally discharged through the drainage hole 35. It is projected into the liquid medium surrounding the distributor 21 and consisting at first of the heavy liquid alone. According to the Archimedes principle, it "floats" in the heavy liquid and tends to approach the free surface situated towards the axis of rotation. On the other hand, in this chamber 16, the continuously fed heavy liquid circulates from the distributor 20 towards the bottom 7 of the chamber and gap 17, while passing between the distributors 21. Counterflow circulation thus occurs between the two series of distributors. In addition, the two liquids are dispersed in each other between the series of distributors by the turbulence produced by the movement, in the liquid medium, of the parts 22, which move relative to the distributors 20 and 21 and the parts 23. Agitation of the liquids during counterflow circulation is thus produced. The light liquid being directed towards the axis of rotation floats above the free layer of heavy liquid and finally fills all the space between the distributors 20, the walls 9 and 14, and the practically cylindrical free surface passing by the outer edge of the openings 10. In this space the partitions 24 prevent the spread of turbulence produced by the protuberances 22 and 23 such that no fine droplets whatsoever of heavy liquid incur the risk of being entrained by the current of light liquid, which flows through the openings 10, is projected tangentially into the drain 29 and finally leaves the apparatus by the orifice 31. In the space comprised between the distributors 21, the walls 9 and 14 and the cylinder 7, the partitions 25 prevent the propagation of the turbulence produced by the protuberances 22 and 23, such that no fine droplets whatsoever of light liquid incur the risk of being entrained by the current of heavy liquid flowing through the gap 17. The limit output of the machine is that at which the entrainment of heavy liquid through the openings 10 and of light liquid through the gap 17 commences to be produced, because the velocity of the current of light liquid towards 10 is higher than the rate of decantation of the heavy liquid in the light liquid in this region, and because the velocity of flow of the heavy liquid towards 17 is higher than the flotation velocity of the light liquid in this zone.

When the machine has reached its operating equilibrium, the levels of the liquids in the apparatus are stabilised at constant rates of feed. The free surface of the liquid in the chamber 16 is closer to the axis than in the chamber 15, because the mean density of the liquid contained therein is less. This mean density results from the presence of heavy liquid in the zone of the partition 25, of light liquid in the zone of the partition 24, and of a mixture of both liquids in the zone between 20 and 21. For chamber 16 of the apparatus to function under these conditions, the position of the free surfaces of the liquids must be adapted to the ratios of the densities. For this purpose, the part 13 selected for a treatment has the edge situated closer to or farther away from the axis, depending on whether the ratio of the density of the heavy liquid to that of the light liquid approaches unity more or less.

To stop the operation of the treatment of the liquids, the feed of the tubes 26 and 27 is interrupted. The flow through the orifices 31 and 32 ceases almost at once. The drive of the pulleys 5 and 6 is then stopped. The drum and rotor gradually slow down and then stop. All the liquids contained in the rotating parts are then subjected to the action of gravity alone. They flow mixed through the openings 10, the drain 29 and the orifices 31, to which it will be possible to connect a branch.

The arrangement of FIG. 1 is interesting owing to the fact that the liquids contained in the drum and rotating conduits are completely discharged when the machine stops. This arrangement is therefore well adapted for an apparatus for different successive manufactures. In addition, the deflector 13 is readily accessible for replacement in the case where the successively treated liquids have different density ratios.

Other relative arrangements of shafts, rotors, feed conduits, distributors, discharge sills, anti-turbulence partitions, agitation protuberances are possible in the apparatus carrying out the process.

The apparatus shown in FIG. 2 differs from that of FIG. 1 in the following details: The wall 9 is not provided with openings. The wall 14 is provided with openings 36 at the same distance from the axis of rotation as the openings 10, FIG. 1. These openings 36 are extended by cylindrical sleeves 37, which pass through the conduits 18 and 19, and are liquid-tight relative to them. A conical deflector 38 envelopes the edge of these sleeves, a drain 39, provided in the casing, surrounds the deflector 38. It is provided with an outlet 40.

The general mode of operation of the apparatus according to FIG. 2 is the same as that of FIG. 1, but the light liquid leaves the chamber 16 upwardly through the openings 36, the drain 39 and the outlet 40. This apparatus has the two outlets 32 and 40 grouped together in the upper part of the machine, whereby they may be isolated more readily from the mechanical part.

The apparatus shown in FIG. 3 differs from that of FIG. 1 in the following arrangements: The wall 9 is equipped with openings 41, the edge of which is situated at the same distance from the axis as the flange 13 of FIG. 1. The wall 12 is provided with a deflector 42 situated at the same distance from the axis as the flanges of the openings 10 of FIG. 1. The chamber 15 is placed between the wall 9 and the rotor 14. The distributors 20 and 21 have their free ends turned upward in the chamber 16.

The general mode of operation of the apparatus is the same as that of FIG. 1, but the light liquid leaves at the top of the apparatus by the flange 42, the drain 30 and the outlet 32; the heavy liquid leaves at the bottom of the apparatus through the opening 41, the drain 29 and the outlet 31.

The apparatus shown in FIG. 4 differs from that of FIG. 1 in the following arrangements: The drum is driven by the solid shaft to which it is connected by the upper wall 42 and the hub 43. The conduits 18 and 19 are fixed to the wall 42 as are also the distributors 20 and 21 the free ends of which are directed downward. The inner rotor 14 is driven by the hollow shaft, to which it is connected by the hub 44. It is provided with openings 45, arranged at the same distance from the axis as the flange 13 of FIG. 1. The conical deflector 46 envelopes the openings 45. A drain 47, provided in the casing below the drain 29, surrounds the deflector 46. The lower wall of the drum is provided with a deflector 48 surrounded by the drain 29. The light liquid leaves through the openings 45, is led by the deflector 46 to the drain 47 and towards the outlet 49. The heavy liquid leaves by the deflector 48, in the drain 29 and the outlet 31. This device enables the outlets to be grouped together under the machine.

FIG. 5 shows the rotor of an apparatus to be provided with drains arranged as in FIG. 3. The drum and the inner rotor 14 are driven as in FIG. 4, but the rotor has no openings. The top wall 42 of the drum is provided with openings 50 arranged at the same distance from the axis as the openings 45 of FIG. 4. These openings are extended by cylindrical sleeves 51 passing across the conduits 18 and 19, relative to which they are liquid-tight. Their conical deflector 52 envelopes the edges of the sleeves. The heavy liquid flows over the sill 48 as in FIG. 4. The light liquid leaves the drum through the openings 50, sleeves 51 and deflector 52.

FIG. 6 shows the rotor of an apparatus to be equipped with drains arranged as in FIG. 3. The rotors are driven by the shafts as in FIG. 1. The rotor 14 carries the conduit 18 terminating at the distributors 20. The wall 12 of the drum carries the conduit 19 terminating at the distributors 21. Openings 53, provided in the wall 12, are extended by sleeves 54 which pass through the conduit 19. A deflector 55 envelopes the outer edges of the sleeves. The heavy liquid leaves through the openings 41 in the wall 9. The light liquid leaves through the openings 53 in the wall 12. The distributors 20 are movable relative to the distributors 21. By means of this arrangement, it is possible to provide the chamber 16 with agitation protuberances 56 extending perpendicularly to the axis and fixed alternately on the rotor 14 (or the distributors 20) and the wall 12 (or the distributors 21). It would also be possible to fix the distributor 20 on the wall 12 and the distributor 21 on the wall 14.

The apparatus shown in FIG. 7 by its rotor only, is to be provided with drains arranged as in FIG. 2. The rotors are driven by the shafts as in FIG. 1. The inner rotor 14 has neither conduits nor openings. The wall 9 of the drum is provided on its inner face with radial conduits 57, the ends 58 of which open in the chamber 15 towards the axis at a suitable level for the discharge of the heavy liquid. These conduits are extended by conduits 59 provided in the wall 7 and terminating through the wall 12 in a circular conduit 60 bounded by a conical wall 61, the edge of which is provided with a deflector 62. The wall 12 supports the two feed conduits 18 and 19 and the distributors 20 and 21. Openings 63 are provided in the wall 12 at a level suitable for the discharge of the light liquid. As already described, they are extended by sleeves 64 and a deflector 65. The heavy liquid fills the chamber 15, flows through the conduits 57, 59, fills the circular conduit 60 and overflows at the deflector 62. The light liquid fills the chamber 16, enters the distributors 20 and the openings 63 through which it flows.

The apparatus shown in FIG. 8 is an adaptation of that of FIG. 7. The relative arrangement of the shafts and rotors is that of FIG. 1. The lower wall 9 of the drum is provided with radial conduits extending from the vicinity of the hub 8, where they open into the chamber 15 through orifices 58, to the wall 7 of the drum, where they are connected to conduits 59 provided in this wall. The conduits 59 open into a circular conduit 60 bounded by the wall 12 of the drum and the outer wall 61. The four walls 12, 61, 66, 67 together and the inner rotor 14 define four co-axial circular conduits; 68, between the rotor 14 and the wall 67; 18, between the wall 12 and the wall 66; 19, between the wall 66 and the wall 67; 60, between the wall 67 and the wall 61. A fixed cylindrical tube 69, of diameter decreasing downward in steps and co-axial with the walls 12, 61, 66, 67, dips into the enclosures defined by the said walls. These four walls are extended respectively, near the axis of rotation, by four cylindrical flanges 70, 71, 72, 73, of different internal diameters, each corresponding to a diameter of the tube 69. Between these cylindrical flanges and the tube are provided sealing joints 74, 75, 76, 77. The tube 69 is provided with openings: 78 in its lower part terminating in the conduit 68; 79 terminating in the conduit 18; 80 terminating in the conduit 19; 81 terminating in the conduit 16. These openings correspond in the tube to four independent conduits, respectively 82, 83, 84, 85, sealed from each other, connected outside the machine to the treatment circuit of the two liquids. A rotating fluid-tight sealing joint 86, arranged between the parts 14 and 8, prevents the passage of liquid between these parts. The agitation means and the partitions of the chamber 16 are not shown.

The mode of operation of this apparatus according to FIG. 8 is as follows: The apparatus rotating at a high speed (drum and inner rotor at slightly different speeds), the supply of heavy liquid is commenced through the conduit 63 of the fixed tube 69. The liquid descends in the conduit, passes through the opening 79 and flows into the rotating conduit 18. The joints 74 and 75 prevent it from spreading into the adjacent conduits. The heavy liquid gradually fills all the enclosure of the rotating parts. The air displaced by the liquid is discharged through the conduits 82, 84 and 85 connected momentarily for this purpose. The joint 86 prevents the heavy liquid from penetrating between the solid shaft and hollow shaft. When the whole of the circuits has been filled with heavy liquid, the connections to the pressure treatment are established, and the supply of the apparatus with light liquid through the conduit 84 of the tube 69 is commenced. The light liquid spreads in the chamber 16, displacing the heavy liquid which was introduced in the conduit 19 and the distributor 21. It reaches the passage 68 and leaves the apparatus through the orifice 78 and the conduit 82 of the tube 69. The seal 74 prevents it from mixing with the heavy liquid passing through the conduit 18. The heavy liquid issuing from the distributors 20 arrives at the orifices 58 by passing through the gap 17 and reaches the conduit 85 by passing through the conduits 57, 59 and 60. The joint 77 prevents the heavy liquid from spreading into the casing, not shown in FIG. 8; the joint 76 prevents it from mixing with the light liquid entering through the conduit 19. The joints 74, 76 are only subject to differential pressures corresponding to the loss of head of the liquids in the apparatus. The joint 75 between the two liquids supplied supports practically no pressure. The joints 73 and 86 alone support the pressure of the treatment circuit. All these joints or seals may be of any form and materials adapted to the liquids, pressures and temperatures. In the apparatus described, as shown in FIG. 8, all the joints of tube 69 are centred on a single shaft fast with the drum.

Figure 9:
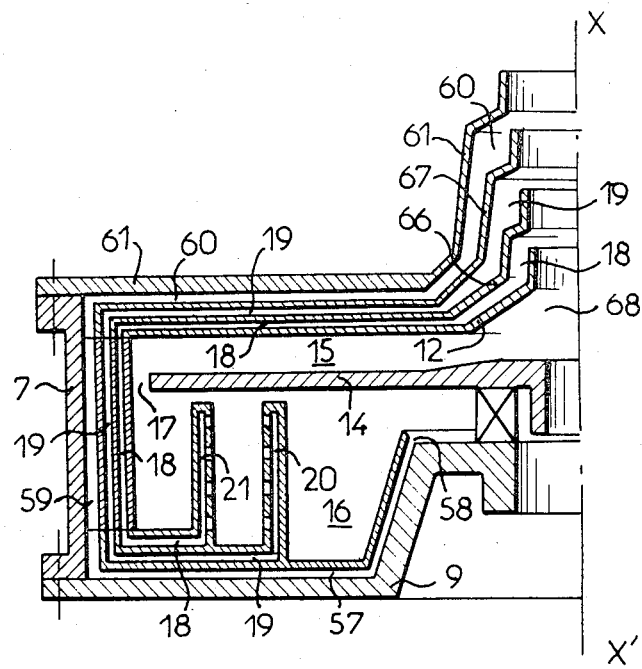
FIG. 9 is a detailed sectional view showing a modification of the arrangement of FIG. 8.

The apparatus according to FIG. 9 is a modification of the preceding apparatus. The distributors 20 and 21 fixed to the wall 9, are supplied through the conduits 18 and 19 extending along the cylinder 7 and the wall 9, parallel to the conduits 59 and 57. The light liquid is discharged through the conduit 57 terminating at 60, the heavy liquid is discharged through 68. The tube 69, not shown, has in FIG. 9, therefore, transposed functions with respect to FIG. 8 for the discharge of the liquids.

Figure 10:
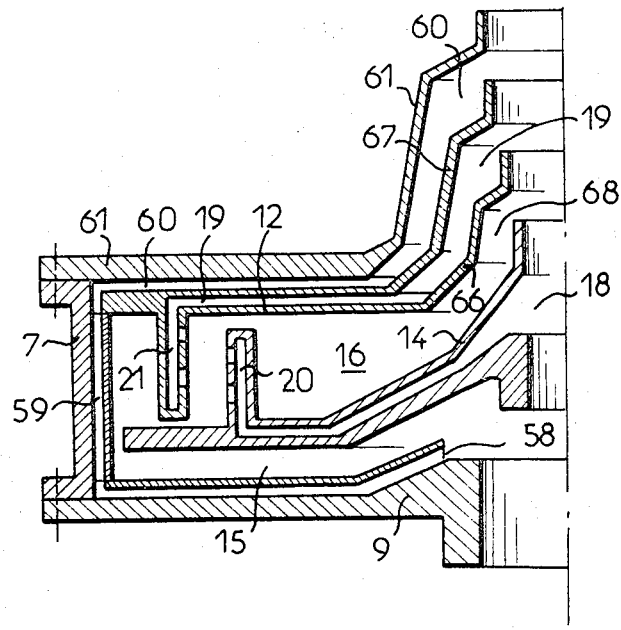
FIG. 10 shows an apparatus according to FIG. 6 adapted to operate under pressure.

The apparatus shown in FIG. 10 is the adaptation of the apparatus shown in FIG. 6 to operate under pressure. The supply of the liquids and their discharge is effected by means of conduits having the same forms and arrangements as in FIG. 8, but the heavy liquid supply conduit 18 is carried by the inner rotor 14. The tube 69, not shown, is therefore centred in relation to parts having a movement relative to each other.

The devices of FIG. 2, FIG. 3, FIG. 5 may be similarly adapted to operation under pressure.

In the devices described above, the protuberances 22 and 23, used for agitating the mixture of liquids between the distributors 20 and 21, may have the most varied forms: Separate rods mounted alternately on the walls 9 and 14, squirrel cages of bars, grids of perforated sheet metal of different diameters, co-axial and mounted alternately on the walls 9 and 14. The ends of the separate rods may be connected toegther by a hoop-shaped part or a polygonal frame which prevents bending of the said rods under the effect of the centrifugal acceleration. The same may be done for the ends of the distributors.

Figure 11:
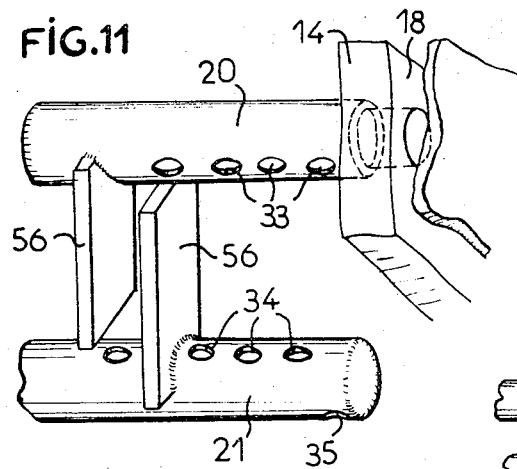
FIGS. 11–13 are perspective views illustrating alternative forms of means for distributing the liquids inside the apparatus.

FIG. 11 shows the relative arrangement of two distributors in an apparatus as described with reference to FIG. 6. 14 is the inner rotor seen in section, 18 is the conduit feeding the apparatus with heavy liquid, 20 is the heavy liquid distributor fixed to 14 and provided with holes 33, 21 is the light liquid distributor provided with holes 34 and the drainage hole 35, 56 are two plates fixed substantially radially to each of the two distributors and turned towards the distributors of the other series. These plates are in relative movement. They may be provided with projections for rendering more general the turbulence produced by their movement in the liquid medium. Similar plates may be mounted on the partitions 24 and 25 shown in FIG. 1.

Figure 12:
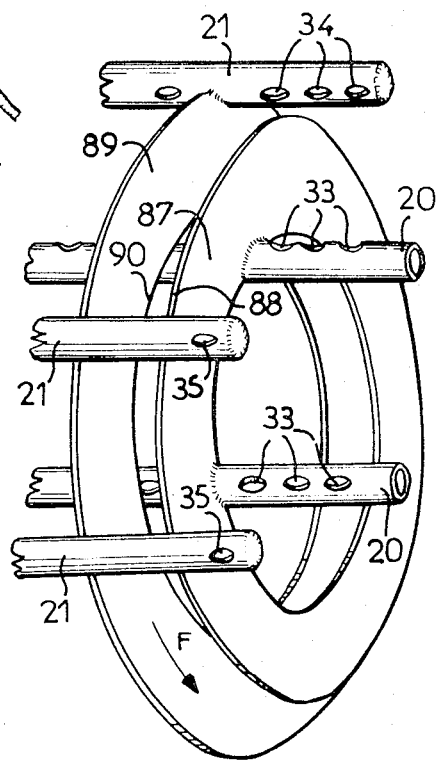

FIG. 12 shows in perspective another combination of distributors and agitation means having the form of rings co-axial with the drum, extending in the whole of the available space between the two series of distributors. These rings are fixed alternatively to either series of distributors so that two adjacent rings are in relative movement. These rings may be provided with lateral projections like the plates in FIG. 11. In FIG. 12, 87 is the sheet-metal ring fixed to the distributors 20. Its outer edge 88 is flush with the distributors 21. The sheet-metal ring 89 is fixed to the distributors 21. Its inner edge 90 is flush with the distributors 20. By means of this device, a well-defined turbulence may be produced in the entire liquid medium and this turbulence is never contrary to the centrifugal movement of the heavy liquid or the centripetal movement of the light liquid.

Figure 13:
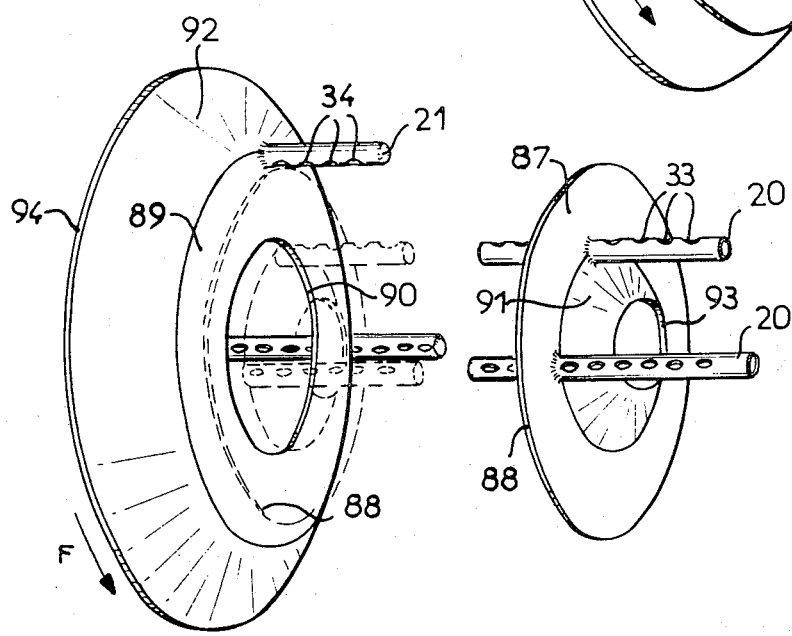

FIG. 13 shows an exploded view of a combination of distributors 20 and 21 and partitions 87 and 89 extended respectively by conical sections of the same conicity, 91 on the inner side and 92 on the outer side. The edge 93 of the inner conical section is on a level with the openings or the discharge edge provided in the chamber 16. The edge 94 is adjacent the wall 7 of the drum. The distributors are fixed to the partitions in the transition zone of ring and cone. The normal position of the ring 87 is shown in dotted lines near the ring 89. The unit comprising the ring 89 and conical section 92 having the edge 94 is in relative movement, shown by the arrow F with respect to the part having the edge 88 shown in dotted lines. The rings are mounted alternately on the distributors 20 and 21. The agitation in the zone between the distributors is produced as in the case of FIG. 6. The set of juxtaposed cones 91 and 92 together define two quiescent zones, like the partitions 24 and 25 in FIG. 1, which they replace.

Figure 14:
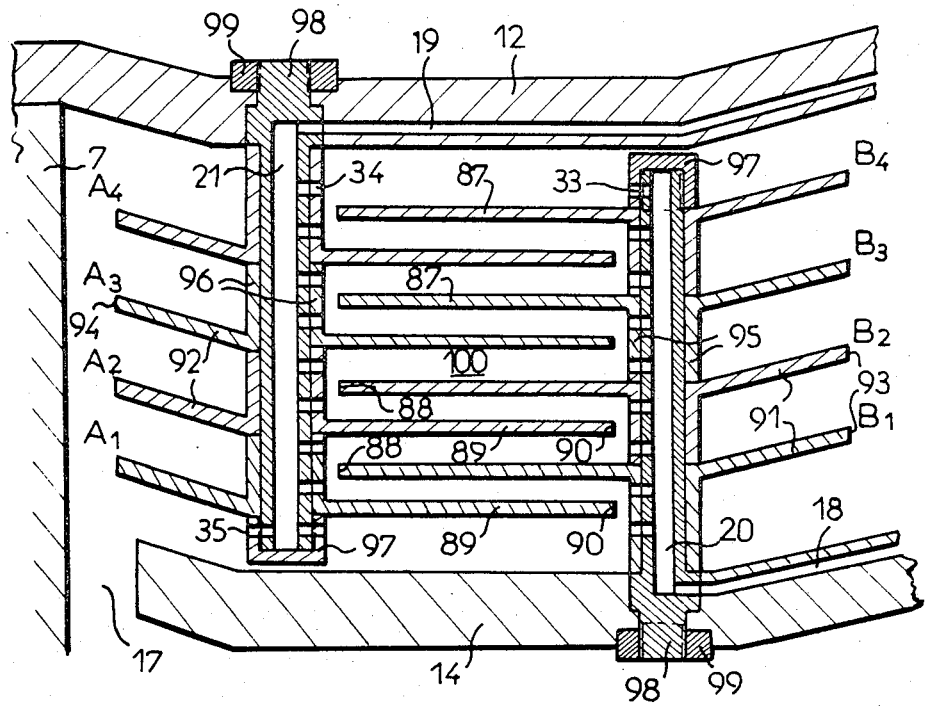
FIG. 14 shows in section a detailed view embodying the arrangement of the distributing and agitating means of FIG. 6.

FIG. 14 shows in section the mounting of a set of rings and conical sections on two series of distributors in an apparatus as shown in FIG. 6. Mounting is effected as follows: Each distributor is fixed to the partition 14 by a nut 99 tightened on the screwthreaded part 98 of the distributor. Each distributor 21 is placed by its free end, closed by a screw cap 97, on the wall 14. The first ring-cone unit $A_1$ is mounted on the distributors 21. It is centered by the sleeve 96 which is provided with a hole corresponding to the hole 34 of the distributor. The sleeve forms a support for the ring-core unit $A_2$. The first ring-cone unit $B_1$, centered on the distributor 20 by the sleeve 95 provided with a hole corresponding to the hole 34, is then mounted. This is continued until the two distributors are fitted. The distributor 20 is then closed by a screw cap 97. The wall 12 is then set on the distributors 21 and the wall 7. The distributors 21 are clamped on the wall 12 by nuts 99, which raises them together with their set of partitions slightly above the wall 14. Relative movement between the sets of distributors and partitions is then possible.

The light liquid leaving the holes 34 passes into the channels formed by two contiguous rings in relative movement, where it meets the heavy liquid circulating in the opposite direction on leaving the holes 33. The two liquids are dispersed in each other by the movement of the partitions provided with projections. The heavy liquid passes between the distributors 21, crosses the non-turbulence zone of the conical partitions 92 and leaves the chamber through the gap 17. The light liquid passes between the distributors 20, crosses the non-turbulence zone of the conical partitions 91 and leaves the rotor by holes, not shown.

Figure 15:
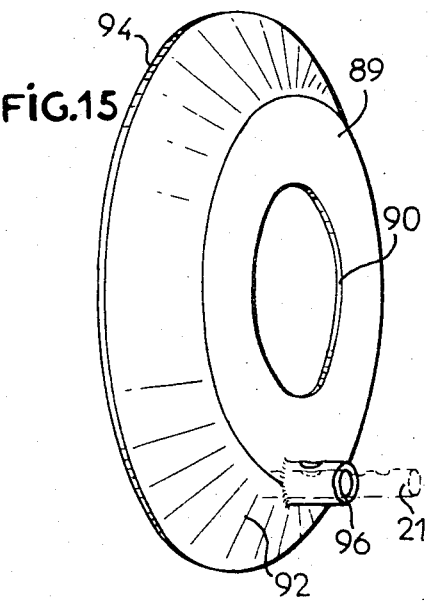

FIG. 15 shows in perspective a unit comprising partition ring 89, cone 92, provided with a cylindrical sleeve 96 for centering the partition on the distributor and for bracing together two successive partitions.

Figure 16:
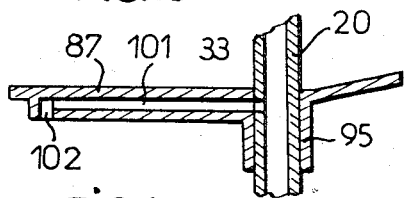

FIG. 16 shows a partition such as $B_1$, FIG. 14, provided with a channel 101 corresponding to the hole 33 leading liquid to the vicinity of the outer edge where it is distributed by the hole 102.

Figure 17:
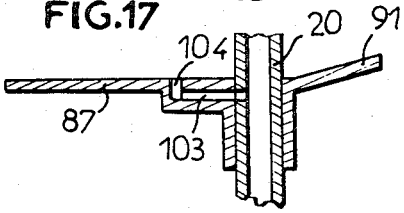

FIG. 17 shows a partition, such as $B_1$ in FIG. 14, comprising a channel 103 leading the liquid to the vicinity of the distributor through a hole 104.

FIG. 18 and FIG. 19 shows the combination of the elements of FIG. 16 and FIG. 17. The distributors 20 and 21 are fixed alternately to the inner rotor 14 at the same distance from the axis. The distributor 21, supplied by the conduit 19, supports the partitions 87, in which are provided conduits 101, conected to the distributors by the holes 33, and opening towards the periphery of the partitions by holes 102 carried by the end pieces 105. The distributor 20, fed by the conduit 18, and offset on the same diameter of the rotor 14, supports the same partitions, 87, in which are provided the conduits 103 connected to the distributors by the holes 34 and opening at a short distance through the holes 104 carried on the antiturbulence partitions 25, fixed to the outer drum. The heavy and light liquids are fed to the distributors 20 and 21 in the manner already described. The heavy liquid leaves by the holes 104 and enters, near the distributors, in the circular channels defined by the partitions 87 and 107; the light liquid leaves by the holes 102 and enters the same channels remote from the distributors. The two liquids cross each other in these channels. They are dispersed in each other by the relative movement of the partitions 87 and 107, which are provided with projections, not shown, and may be continuous or perforated.

The agitation during counterflow circulation may be obtained by imparting to the protuberances a reciprocating movement parallel to the axis of rotation. FIG. 20 and FIG. 21, which is a section of FIG. 20 along C–D, shows an embodiment on a rotor such as described in FIG. 7, in which the inner rotor 14 is replaced by a partition 108 fixed to the drum, and wherein partitions 109 extend radially from the openings 63 to the bottom 7 of the drum. The distributors 20 and 21 are incorporated in these partitions 109. Tubular rings, co-axial with the drums 110 and 111, are connected to the distributors 20 and 21 and are perforated with holes 112 and 113. Protuberances 117 are mounted on the partitions 109, between the two series of distributors. A set of parts 114 is fixed by arms 115 and the hub 116 to the solid shaft, which rotates at the same speed as the hollow shaft, which has a reciprocatory movement of adjustable frequency and amplitude. This set acts in the zone in which agitation is to be produced between the two series of rings 110 and 111, so that the parts 114 and 117 cross one another without touching. The heavy and light liquids, fed as already described, leave by the holes 112 and 113 and are dispersed in each other by the relative reciprocatory movement of the protuberances 114 and 117.

The agitation of the two liquids may also be obtained by means of ultrasonic generating units, carried for example by the partition 108, FIG. 20, and replacing all or part of the movable equipment 115.

The apparatus for carrying out the process may have a horizontal axis and may be overhung or have a bearing at either end of the rotor. In the latter case, the cylindrical part 73, FIG. 8, may be fast with the hollow shaft corresponding to the bearing situated on this side of the apparatus. Or again the tube 69, fast with the drum, forms the hollow shaft.

The partitions provided in the chamber 16 may be of any form compatible with the flow of the liquids and the movement of the agitation protuberances.

We claim:

1. Apparatus for carrying out liquid-liquid extraction by counterflow of a heavy liquid and of a light liquid moving in opposite directions while under the action of a centrifugal field, the apparatus comprising a rotatably mounted hollow, cylindrical drum, a radially extending rotary member arranged within said drum and mounted to rotate coaxially therewith, said rotary member and the inner walls of said hollow drum defining a treatment chamber having substantial radial and axial extents, means for independently and adjustably driving the drum and the inner rotary member at different rotational speeds, means defining different flow paths into said treatment chamber for introducing into said treatment chamber a heavy liquid and a light liquid separately at positions nearer to the axis of rotation and to the periphery of said chamber respectively, said means defining different flow paths into said treatment chamber having discharge outlets into said chamber at said positions opposed to each other for discharging the heavy liquid and the light liquid in opposite directions toward one another, said outlets being disposed spaced circumferentially and axially along the axial extent of said chamber, whereby said heavy and light liquids are moved radially the one through the other in opposite directions under the action of the centrifugal field from the axis to the periphery and from the periphery to the axis respectively along radial paths extending axially over the entire axial extent of said chamber, means for discharging both liquids from the drum, and agitating means mounted in the treatment chamber on at least one of said drum and inner rotary member for agitating said liquids during the radial counterflow movement thereof while under the action of the centrifugal field.

2. Apparatus according to claim 1, including means for imparting reciprocating motion to said agitating means.

References Cited

UNITED STATES PATENTS

| | | | |
|---|---|---|---|
| Re. 21,168 | 8/1939 | Coutor | 23—270.5 |
| 2,176,982 | 10/1939 | Thayer | 23—269 |
| 2,273,835 | 2/1942 | Cornell | 23—270.5 |
| 2,281,796 | 5/1942 | Podbielniak | 23—270.5 |
| 2,286,157 | 6/1942 | Podbielniak | 23—270.5 |
| 2,705,594 | 4/1955 | Brewer | 23—269 |
| 2,941,872 | 6/1960 | Pilo et al. | 23—270.5 |
| 2,995,612 | 8/1961 | Hervert | 23—269 |
| 3,486,743 | 12/1969 | Todd | 23—270.5 |

NORMAN YUDKOFF, Primary Examiner

R. T. FOSTER, Assistant Examiner

U.S. Cl. X.R.

23—270.5